US010530878B2

(12) United States Patent
Huang et al.

(10) Patent No.: US 10,530,878 B2
(45) Date of Patent: Jan. 7, 2020

(54) METHOD AND SYSTEM FOR PUSHING INFORMATION TO END USERS ADAPTIVELY (71) Applicant: Tencent Technology (Shenzhen) Company Limited, Shenzhen (CN)

(72) Inventors: Yu Huang, Shenzhen (CN); Xing Li, Shenzhen (CN); Shenxing Yuan, Shenzhen (CN); Pingfeng Cheng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 657 days.

(21) Appl. No.: 14/818,742

(22) Filed: Aug. 5, 2015

(65) Prior Publication Data
US 2015/0341457 A1 Nov. 26, 2015

Related U.S. Application Data (63) Continuation of application No. PCT/CN2014/080710, filed on Jun. 25, 2014.

(30) Foreign Application Priority Data

Jun. 28, 2013 (CN) .......................... 2013 1 0269563

(51) Int. Cl.
G06F 15/16 (2006.01)
H04L 29/08 (2006.01)
(52) U.S. Cl.
CPC .................... H04L 67/26 (2013.01)
(58) Field of Classification Search
CPC ....................................................... H04L 67/26
(Continued)

(56) References Cited

U.S. PATENT DOCUMENTS 6,931,419 B1* 8/2005 Lindquist ............. G06Q 10/109
705/26.1
7,024,374 B1* 4/2006 Day ....................... G06Q 30/02
705/14.25
(Continued)

FOREIGN PATENT DOCUMENTS

CN 1874233 A 12/2006
CN 101262497 A 9/2008
(Continued)

OTHER PUBLICATIONS

Tencent Technology, Written Opinion, PCT/CN2014/080710, dated Sep. 23, 2014, 6 pgs.
(Continued)

Primary Examiner — Anthony Mejia
(74) Attorney, Agent, or Firm — Morgan, Lewis & Bockius LLP (57) ABSTRACT A method for a computer server to adaptively push primary target information to terminals associated with an end user is provided. Upon detecting an operation initiated by the end user from a target terminal, the computer server determines primary target information to be pushed to the target terminal in accordance with the operation information and information of the end user. The computer server then acquires push control information for the primary target information, the push control information including push parameter information, related secondary target information and combined push frequency control information. Next, the computer server acquires push records of the primary and related secondary target information, respectively, according to the push parameter information. Finally, the computer server pushes the primary target information to the target terminal adaptively according to the combined frequency control
(Continued)

information as well as the push records of the primary and the related secondary target information thereof.

14 Claims, 5 Drawing Sheets

(58) Field of Classification Search
USPC ......................................................... 709/219
See application file for complete search history.

(56) References Cited

U.S. PATENT DOCUMENTS

| | | | | |
|---|---|---|---|---|
| 7,430,599 | B2* | 9/2008 | Mariani | H04L 67/22 709/200 |
| 7,890,586 | B1* | 2/2011 | McNamara | H04L 12/1859 709/206 |
| 8,442,858 | B1* | 5/2013 | Barnes | G06Q 30/02 705/14.4 |
| 9,672,525 | B2* | 6/2017 | Dean | G06Q 30/02 |
| 9,978,022 | B2* | 5/2018 | Tseng | G06Q 30/0261 |
| 2003/0018524 | A1* | 1/2003 | Fishman | G06Q 30/0254 705/14.52 |
| 2004/0093327 | A1* | 5/2004 | Anderson | G06Q 30/02 |
| 2004/0193488 | A1 | 9/2004 | Khoo et al. | |
| 2005/0235307 | A1* | 10/2005 | Relan | H04N 21/25875 725/14 |
| 2006/0159109 | A1* | 7/2006 | Lamkin | G11B 27/10 370/401 |
| 2006/0161635 | A1* | 7/2006 | Lamkin | G06F 16/4387 709/217 |
| 2007/0100978 | A1* | 5/2007 | Levi | H04L 51/14 709/223 |
| 2008/0059631 | A1* | 3/2008 | Bergstrom | H04N 7/17318 709/224 |
| 2009/0076907 | A1* | 3/2009 | Litwin | H04N 21/266 705/14.69 |
| 2009/0318131 | A1* | 12/2009 | Aaron | H04W 4/20 455/423 |
| 2010/0058382 | A1* | 3/2010 | Yu | H04N 7/17318 725/35 |
| 2010/0324995 | A1 | 12/2010 | Ward et al. | |
| 2011/0014972 | A1* | 1/2011 | Herrmann | G06Q 30/0224 463/25 |
| 2011/0145063 | A1* | 6/2011 | Qureshi | G06Q 30/02 705/14.52 |
| 2011/0184863 | A1* | 7/2011 | Coleman | G06Q 20/102 705/40 |
| 2011/0185202 | A1* | 7/2011 | Black | H04W 52/0258 713/320 |
| 2011/0320284 | A1* | 12/2011 | Tennenholtz | G06Q 30/02 705/14.69 |
| 2012/0110074 | A1 | 5/2012 | Getchius | |
| 2012/0150993 | A1* | 6/2012 | Flack | H04W 4/18 709/217 |
| 2012/0166432 | A1* | 6/2012 | Tseng | G06Q 30/0261 707/728 |
| 2012/0215621 | A1* | 8/2012 | Heffernan | G06Q 30/02 705/14.41 |
| 2013/0073336 | A1* | 3/2013 | Heath | G06Q 30/02 705/7.29 |
| 2013/0073388 | A1* | 3/2013 | Heath | G06Q 50/01 705/14.53 |
| 2013/0117399 | A1* | 5/2013 | Appelman | G06F 9/542 709/206 |
| 2013/0246175 | A1* | 9/2013 | Bilange | H04L 67/20 705/14.53 |
| 2013/0332262 | A1* | 12/2013 | Hunt | G06O 30/02 705/14.43 |
| 2013/0332276 | A1* | 12/2013 | Takami | G06Q 30/0255 705/14.53 |
| 2014/0025735 | A1* | 1/2014 | Garcia-Martinez | G06Q 30/0251 709/204 |
| 2014/0046753 | A1* | 2/2014 | Rabii | G06O 30/0269 705/14.41 |
| 2015/0106199 | A1* | 4/2015 | Ishida | G06Q 30/0255 705/14.53 |
| 2018/0035550 | A1* | 2/2018 | Wang | H01L 24/75 |

FOREIGN PATENT DOCUMENTS

| | | |
|---|---|---|
| CN | 101489111 A | 7/2009 |
| CN | 101656617 A | 2/2010 |
| CN | 103327110 A | 9/2013 |
| TW | 200820114 A | 5/2008 |
| WO | WO 2009/103497 A1 | 8/2009 |
| WO | WO 2010078539 A2 | 7/2010 |

OTHER PUBLICATIONS

Tencent Technology, IPRP, PCT/CN2014/080710, Dec. 29, 2015, 7 pgs.

Tencent Technology, ISR, PCT/CN2014/080710, Sep. 23, 2014, 3 pgs.

* cited by examiner

METHOD AND SYSTEM FOR PUSHING INFORMATION TO END USERS ADAPTIVELY

RELATED APPLICATION

This application is a continuation application of PCT Patent Application No. PCT/CN2014/080710, entitled "METHOD AND SYSTEM FOR PUSHING INFORMATION TO END USERS ADAPTIVELY" filed on Jun. 25, 2014, which claims priority to Chinese Patent Application No. 201310269563.6, entitled "Information Push Method and System" filed on Jun. 28, 2013, both of which are incorporated by reference in their entirety.

TECHNICAL FIELD

The disclosed embodiments relate generally to the field of Internet technology, and in particular, to method and system for adaptively pushing information to different end users.

BACKGROUND

With the rapid development of internet technology, people have used to receiving various information pushed on the internet, for example, a manner that is most widely adopted by various brand manufacturers is to push medium information to a user through integrating such elements as video, audio, image, animation and the like, which is specifically represented by pushing pre-generated medium information (such as personalized pictures, interesting animations or video advertisements to the user in advance during a "fragmented time" such as before and after playing an internet video, or during a pause status, or starting or ending a software program. However, frequently pushed information may possibly hamper user experience. Therefore, an information push background may take frequency control into consideration while pushing information. That is, an upper limit is set for push times of same information aiming at the same user in the same time interval. When the push times of certain primary target information pushed to the same user in a control cycle reach the upper limit, the primary target information will no longer be pushed to the user. The existing information push frequency control scheme has the defects that the same manufacturer may push a plurality of information having similar contents with respect to different products, different period or different information receiving terminals; the frequency control only with respect to one primary target information therein is not adequately exact usually, which cannot strictly control the situation of hampered user experience caused by repetition of relevant information.

SUMMARY

The above deficiencies and other problems (e.g., bad user experience) associated with the conventional approach of pushing media information to end users are reduced or eliminated by the present application disclosed below. In some embodiments, the present application is implemented in a computer server that has one or more processors, memory and one or more modules, programs or sets of instructions stored in the memory for performing multiple functions and communicating with one or more client devices within a local area network (e.g., a PC, a tablet or a smartphone) that has one or more processors, memory and one or more modules, programs or sets of instructions stored in the memory for performing multiple functions. Instructions for performing these functions may be included in a computer program product configured for execution by one or more processors.

In accordance with some embodiments of the present application, a method for adaptively pushing primary target information to terminals associated with an end user is performed at a computer server. Upon detecting an operation initiated by the end user from a target terminal, the computer server determines primary target information to be pushed to the target terminal in accordance with the operation information and information of the end user. The computer server then acquires push control information for the primary target information, the push control information including push parameter information, related secondary target information and combined push frequency control information. Next, the computer server acquires push records of the primary target information and push records of the related secondary target information, respectively, according to the push parameter information of the primary target information and the push parameter information of the related secondary target information. Finally, the computer server pushes the primary target information to the target terminal adaptively according to the combined frequency control information as well as the push records of the primary target information and the related secondary target information thereof.

In accordance with some embodiments of the present application, a computer server includes one or more processors; memory; and one or program modules stored in the memory. The one or more program modules further include instructions for: detecting an operation initiated by the end user from a target terminal; determining primary target information to be pushed to the target terminal in accordance with the operation information and information of the end user; acquiring push control information for the primary target information, wherein the push control information includes push parameter information, related secondary target information and combined push frequency control information; acquiring push records of the primary target information and push records of the related secondary target information, respectively, according to the push parameter information of the primary target information and the push parameter information of the related secondary target information; and pushing the primary target information to the target terminal adaptively according to the combined frequency control information as well as the push records of the primary target information and the related secondary target information thereof.

In accordance with some embodiments of the present application, a non-transitory computer readable storage medium stores one or more instructions configured for execution by a computer server that includes one or more processors and memory. The instructions, when executed by the computer server, cause the computer server to perform one or more operations comprising: detecting an operation initiated by the end user from a target terminal; determining primary target information to be pushed to the target terminal in accordance with the operation information and information of the end user; acquiring push control information for the primary target information, wherein the push control information includes push parameter information, related secondary target information and combined push frequency control information; acquiring push records of the primary target information and push records of the related secondary target information, respectively, according to the push parameter information of the primary target information and the push parameter information of the related secondary target information; and pushing the primary target information to the target terminal adaptively according to the combined frequency control information as well as the push records of the primary target information and the related secondary target information thereof.

BRIEF DESCRIPTION OF DRAWINGS

The aforementioned implementation of the present application as well as additional embodiments will be more clearly understood as a result of the following detailed description of the various aspects of the present application when taken in conjunction with the drawings. Like reference numerals refer to corresponding parts throughout the several views of the drawings.

To describe the technical schemes in the embodiments of the present application or in the prior art more clearly, the following briefly introduces the accompanying drawings required for describing the embodiments of the present application or the prior art. Apparently, the accompanying drawings in the following description show merely some embodiments of the present application, and a person of ordinary skill in the art may still derive other drawings from these accompanying drawings without creative efforts.

Like reference numerals refer to corresponding parts throughout the several views of the drawings.

DETAILED DESCRIPTION

The technical solution in the embodiments of the present application will be clearly and completely described with reference to the accompanying drawings hereinafter. Apparently, the embodiments described here are only some embodiments, rather than the all embodiments of the present application. Based on the embodiments in the present application, all other embodiments made by a person of ordinary skill in the art without making any creative effort, shall fall within the protection scope of the present application.

The information in the embodiments of the present application may be medium information integrating such elements as video, audio, image, animation and the like, which is specifically represented by personalized pictures, interesting animations or video advertisements that can be pushed by the information push system in the embodiments of the present application to a terminal at a user side to display, wherein the terminal may refer to such terminal equipment as PC (Personal Computer, personal computer), tablet computer, mobile phone, smartphone, laptop computer and the like. The terminal may be communicated with the information push system at a background through logging in with a user account number.

Figure 1:
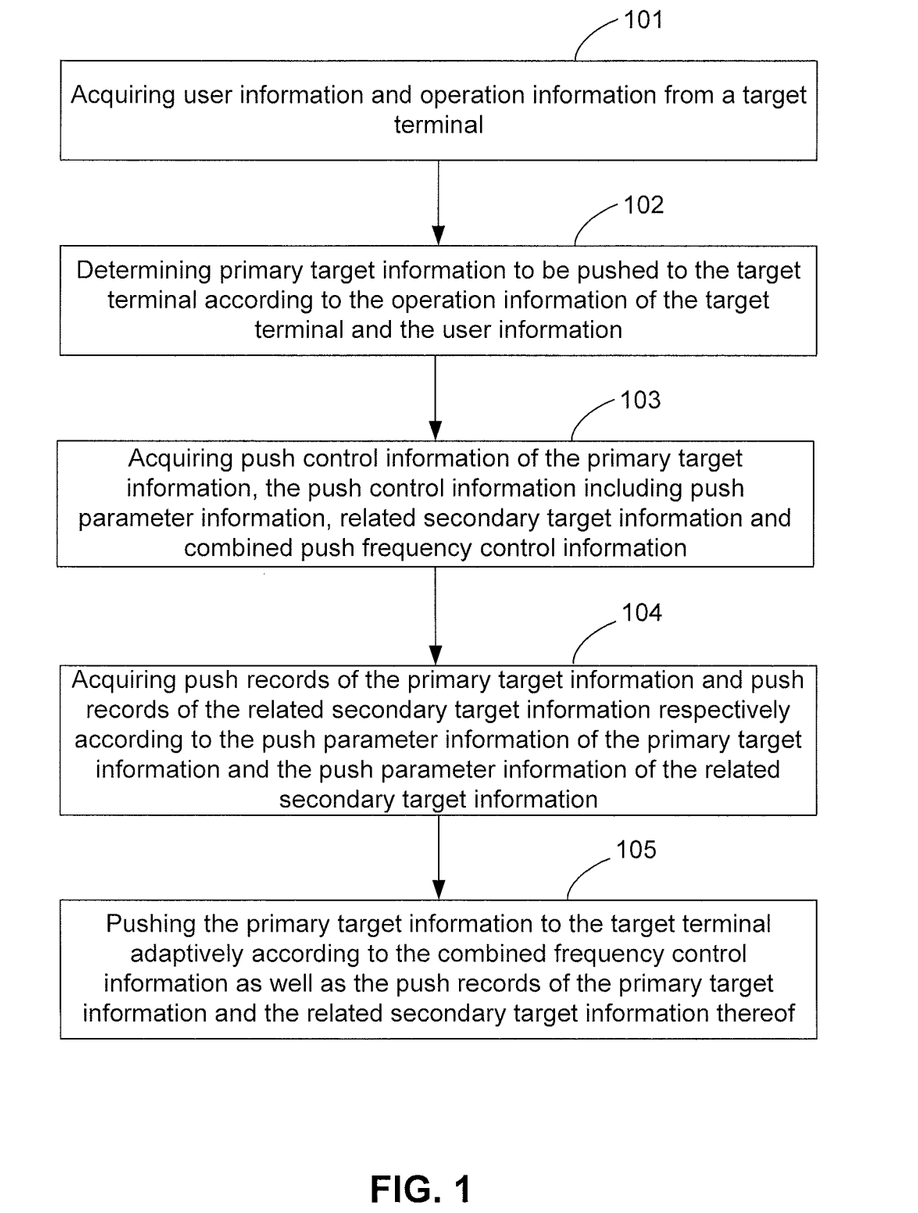
FIG. 1 is a flow chart of an information push method according to one embodiment of the present application.

FIG. 1 is a flow chart of an information push method according to an embodiment of the present application. The information push method in the embodiment of the present application may be performed by an information push system. In specific implementation, the information push system may be integrally implemented in a background server that provides an information push business. In an optional embodiment, the information push system may also comprise a plurality of servers having specific functions, and the information push in the present application is implemented through the mutual cooperation of the plurality of servers having specific functions. The information push method in the embodiment as shown in FIG. 1 may comprise the steps as follows.

Step 101: Acquiring user information and operation information from a target terminal. In specific implementation, the target terminal may log in the information push system with a user account number. After the system is successfully logged in, the information push system may acquire the user information of the target terminal, wherein the user information is information used for identifying a user identification, and may comprise the login account number, the user ID, the network address, the cookies and the like of the target terminal, so that the information push system may monitor operations of the user, for example, such operations of the user as clicking to browse a certain website, clicking to play a certain video or opening a certain software program, and the like.

In some embodiments, the information push method depicted in FIG. 1 is performed by a computer server that provides Internet services, e.g., online video streaming, to a large number of end users. Each end user logs into his/her user account first before receiving any service. Therefore, upon detection of an operation initiated by an end user from a target terminal, the computer server not only knows what the operation is, e.g., streaming a particular music video on the target terminal, but also tracks down the identity of the end user that initiates this operation. As will be described below, both the operation information and the user information may be used for determining what target information to be pushed to the target terminal subsequently.

Step 102: Determining primary target information to be pushed to the target terminal according to the operation information of the target terminal and the user information. In specific implementation, the information push system may set push parameter information for each primary target information, wherein the push parameter information comprises conditions for pushing the primary target information to a user in which situations, for example, pushing corresponding primary target information to the user during a "fragmented time" such as before and after playing an internet video, or during a pause status, or starting or ending a software program. The information push system after determining that the primary target information meets a push condition of certain primary target information according to the acquired operation information of the target terminal, determines that the primary target information needs to be pushed to the target terminal.

In some embodiments, the computer server identifies one or more keywords for the end user-initiated operation. For example, if the operation is to download a song or a webpage from a website, the computer server can identify the album of the song or the singer of the song or the title of the webpage. Using the identified keywords, the computer server then queries an information database for target information to be pushed to the target terminal and displayed to the end user. For example, the computer server may identify a link to a music video prompting the most recent album of the same singer as primary target information. Other target information includes a website selling products of interest to the end user based on the user information as well as other information (e.g., the current location of the end user or the current time). In other words, the computer server identifies at least one piece of primary target information that is deemed to be relevant to the end user. But as will be described below, there are other conditions that the computer server needs to satisfy before sending this primary target information to the target terminal.

Step 103: Acquiring push control information of the primary target information. The push control information comprises push parameter information of the primary target information, related secondary target information and combined push frequency control information, wherein the related secondary target information comprises push parameter information of at least one related secondary target information of the primary target information. In specific implementation, the information push system may acquire the push parameter information of the primary target information selected by an information push customer through providing a predetermined reservation interface for the customer in advance, wherein the push parameter information comprises selected useable push conditions and effective time (including start effective time and end effective time), then set at least one other push information as related secondary target information associated with the primary target information according to a selecting operation of the customer, and thereby acquiring combined push frequency control information set by the information push customer, wherein the combined push frequency control information may comprise a control cycle set by the information push customer and a push frequency upper limit in each control cycle. The information push system may write the push control information of the primary target information in a preset push control information data base, and read the push control information from the push control information data base when necessary. Subsequently, an association relationship between the push control information and certain or a plurality of related secondary target information may be cancelled in real time according to the operation of the information push customer.

In the embodiment of the present application, the related secondary target information may be unique push information designated by the information push customer, for example: push information belonging to the same information push customer as the primary target information but aiming at different products; or push information belonging to the same information push customer as the primary target information, for the same product, but aiming at different periods. For example, push information of an information push customer A aiming at a product a is recorded as a1, and an effective period is 1st~15th days of the current month, and then information of the same content pushed again aiming at the product a for which the effective period is 16th~30th days of the current month is recorded as a2, then the information push system may set a1 and a2 as related secondary target information according to settings of the user. Otherwise, for a plurality of different primary target information pushed aiming at different information display terminals, for example, the information push customer A respectively pushes information b1 aiming at a PC terminal user and information b2 aiming at a mobile phone terminal user, with respect to a product b, then the information push system may set b1 and b2 as related secondary target information according to the settings of the user. also for push information having push parameter information associated with the primary target information, for example, the information push customer A respectively pushes information c1, c2 and c3 at a forward statue, a pause status and a reverse status of a certain movie of on-demand video, then the information push system may set c1, c2 and c3 as related secondary target information according to the settings of the user to perform combined frequency control.

In some embodiments, the combined push frequency control information indicates that how the primary target information and the related secondary target information should be presented to the end user. In today's world, marketing information is prevalent on the Internet. People are exposed to different types of marketing information almost all the time in many different formats. To improve the effectiveness of marketing information (e.g., click-through rate) and avoid the potential adverse consequence, the online marketing information providers need to be very careful before pushing a particular piece of marketing information to a target end user's terminal.

In some embodiments, the terms "primary target information" and "secondary target information" are relative ones depending on their relationship to the end user and the end user initiated operation. In other words, the primary target information associated with one operation may be secondary target information associated with another operation and vice versa. Similarly, the primary target information for one end user at one moment may be secondary target information related to another primary target information for another end user or the same end user at a different moment. For example, the primary and second target information may correspond to different products offered by the same company or the same type of products (or services) offered by different companies.

Step 104: Acquiring push records of the primary target information and push records of the related secondary target information respectively according to the push parameter information of the primary target information and the push parameter information of the related secondary target information, wherein the push record comprises a push time for pushing the primary target information or the related secondary target information to a terminal corresponding to the user information in each time. In specific implementation, the information push system may regularly read the push control information of the primary target information from the push control information data base, generate XML push data and transfer the data to a module implementing an information push function to generate primary target information used for pushing, push the primary target information to a target terminal when preset push conditions are satisfied, generate push records of the primary target information during each time of pushing and write the push record in a preset push record data base, and the information push system may read the push record from the data base when required. In an optional embodiment, the module implementing the information push function in the information push system may be implemented by a single information push server. The information push server regularly reports the push record of the information to a data server of the information push system.

In some embodiments, the push records of the primary and related secondary target information indicate when the end user was exposed to such information in the past and where such exposure occurred, e.g., on what type of terminal devices. Such push records are one important consideration when the computer server determines whether or not to push the primary target information to the target terminal that triggers this process. For example, if the push records indicate that most of the past exposures of the primary and related secondary target information occurred at a different terminal other than the target terminal, the computer server may prefer to push the primary target information to the target terminal. Conversely, if the records indicate that there was at least one exposure of the related secondary target information on this target terminal within a predefined time window (e.g., a hour), the potential value of pushing the primary target information to the target terminal may be diminished because such frequent exposure may not be well-received by the end user. In some embodiments, the location information of the past exposures is another factor when the computer server determines where or not to push the target information to the target terminal. For example, if the location of the target terminal is close to the location information of the past exposures, the computer server may not consider pushing the target information to the target terminal because the new exposure may be deemed to be repetitive and not get enough attention from the end user. Conversely, the computer server may favor pushing the target information to the target terminal if the target terminal is at a location more remote from the locations of the past exposures and the target information is more proximate to the location of the target terminal. For example, if the target information is a chain restaurant's promotion and the target terminal happens to be close to one of the restaurants, the computer server may be more likely to push the target information to the target terminal.

Step 105: Pushing the primary target information to the target terminal adaptively according to the combined push frequency control information as well as the push records of the primary target information and the related secondary target information thereof. In specific implementation, the information push system may judge whether the push times of the primary target information and the related secondary target information thereof to the terminal corresponding to the user information in the control cycle reaches the push frequency upper limit according to the push records of the primary target information and the related secondary target information thereof; if yes, then stop pushing the primary target information to the target terminal within the current control cycle. Further, the information push system may modify the XML push data of the primary target information and related secondary target information thereof according to the combined push frequency control information and the push records of the primary target information and related secondary target information thereof and then conducts control for pushing the primary target information to the target terminal according to the modified XML push data, thus implementing control for pushing the primary target information to the target terminal. In an optional embodiment, the information push system may also, after the push times of the primary target information and related secondary target information thereof to the terminal corresponding to the user information reach the push frequency upper limit, change a push strategy of the primary target information and related secondary target information thereof to the terminal corresponding to the user information. For example, pushing the information to the terminal corresponding to the user information is changed from pushing whenever the push conditions are satisfied into pushing for once only in every 10 minutes, or into pushing medium information of a shorter push time version, and the like.

As noted above, there are many factors that the computer server considers before pushing the primary target information to the target terminal. Some of these factors may favor pushing the primary target information while other factors may be opposite. Using the acquired push control information and the push records, the computer server may weigh them against one another according to a predefined algorithm to determine whether or not it should push the primary target information to the target terminal. For example, the combined frequency control information indicates how often the primary and related secondary target information should be shown to the end user. The push records indicate that how often the target information was shown to the end user in the past. A combination of the combined frequency control information and the push records may give the computer server an indicator of whether or not it should push the primary target information to the target terminal. In some embodiments, the computer server may determine that it should not push the primary target information to the target terminal after taking into account of various factors. In some other embodiments, the computer server may determine that it should withhold pushing the primary target information for at least a predefined time period based on considering the combined frequency control information and the push records. For example, if the end user chooses to stream a video to the target terminal, the computer server may consider pushing the target information to the target terminal while the target terminal is playing back the video or after the target terminal completes the video streaming.

In some embodiments, the computer server determines a pattern from the push records of the primary target information and the related secondary target information thereof. For example, the computer server may select those push records that were deemed to be successful (e.g., when the end user others spent substantial time watching the target information) and determine the location and time information associated with those successful pushes. Next, the computer serve checks whether the current time and location of the target terminal satisfy the same pattern or not. In some embodiments, the computer server may determine a timing of pushing the primary target information to the target terminal based on a comparison result. By doing so, the computer server increases the chance that the end user is impressed by the target information.

Figure 2:
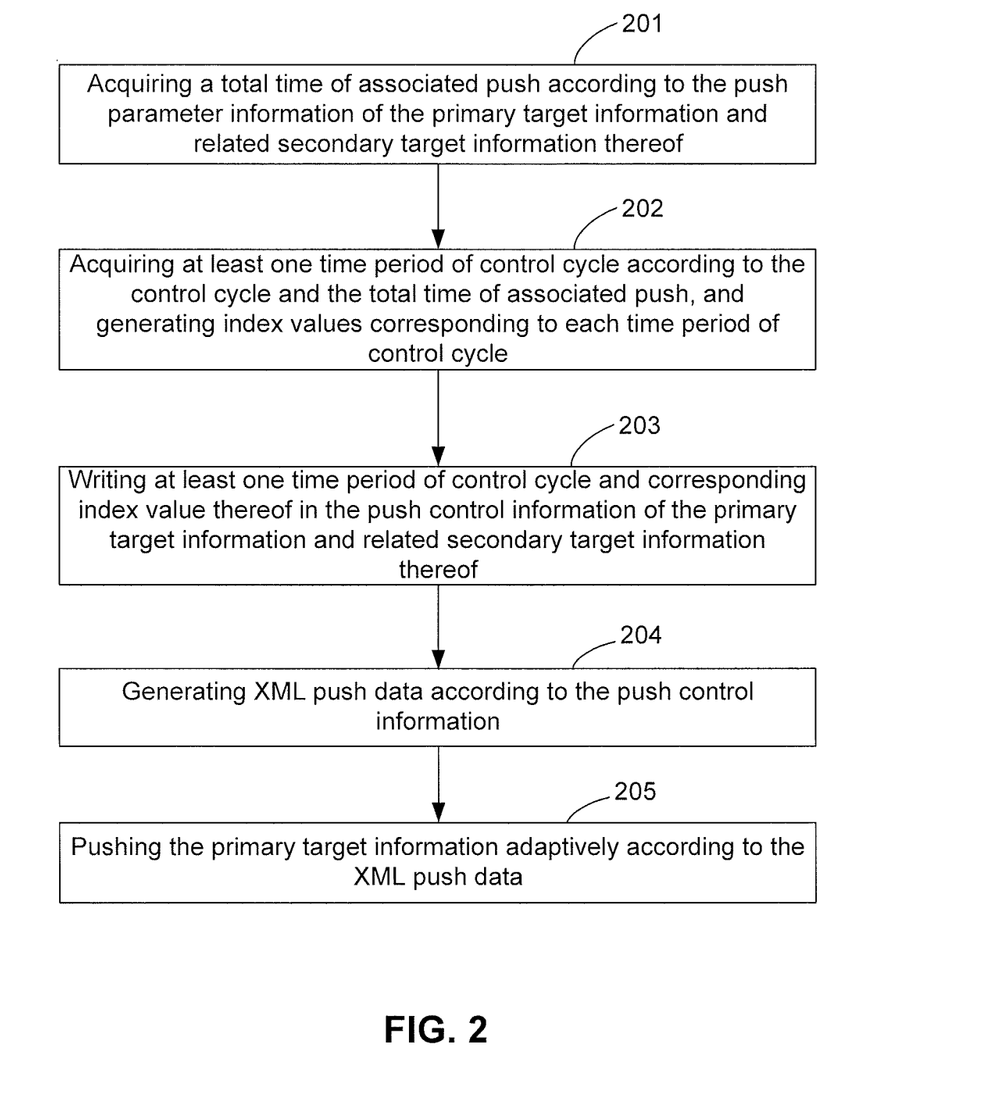
FIG. 2 is a flow chart of an information push method according to another embodiment of the present application.

FIG. 2 is a flow chart of an information push method according to another embodiment of the present application. Preferably, the embodiment may be a push flow after the information push system pushes the primary target information for the first time or the push control information according to the primary target information is changed. As shown in the FIG., the information push method according to the embodiment of the present application may comprise the following steps.

Step 201: Acquiring a total time of associated push according to the push parameter information of the primary target information and related secondary target information thereof. In specific implementation, the information push system may respectively acquire start effective time and end effective time of the primary target information and related secondary target information thereof, and the earliest start effective time to the latest end effective time are taken as the total time of associated push. In an optional embodiment, the information push system may also acquire the latest end effective time, and a time period from the current time to the latest end effective time is taken as the total time of associated push.

Step 202: Acquiring at least one time period of control cycle according to the control cycle and the total time of associated push, and generating index values corresponding to each time period of control cycle. In specific implementation, if the control cycle is no less than the total time of associated push, then the total time of associated push may be taken as one time period of control cycle. If the control cycle is less than the total time of associated push, then the total time of associated push may be split to obtain 2 or more than 2 time periods of control cycle, wherein each time period of control cycle is uniquely corresponding to one index value.

Step 203: Writing at least one time period of control cycle and corresponding index value thereof in the push control information of the primary target information and related secondary target information thereof.

Step 204: Generating XML push data according to the push control information.

Step 205: Pushing the primary target information and related secondary target information thereof adaptively according to the push control information comprising at least one time period of control cycle and corresponding index value thereof, and generating push records of the primary target information and related secondary target information thereof during each time of pushing, wherein the push record further comprises the index value corresponding to the time period of control cycle to which the push time belongs. In specific implementation, the information push system may generate XML push data according to the push control information of the primary target information, and generate push records of the primary target information during each time of pushing. Specifically, the information push system may transfer the XML push data to a module implementing an information push function to generate primary target information used for pushing, and push the primary target information to a target terminal when preset push conditions are satisfied. In an optional embodiment, the module implementing the information push function in the information push system may be implemented by a single information push server. The information push server regularly reports the push record of the information to a data server of the information push system.

Figure 3:
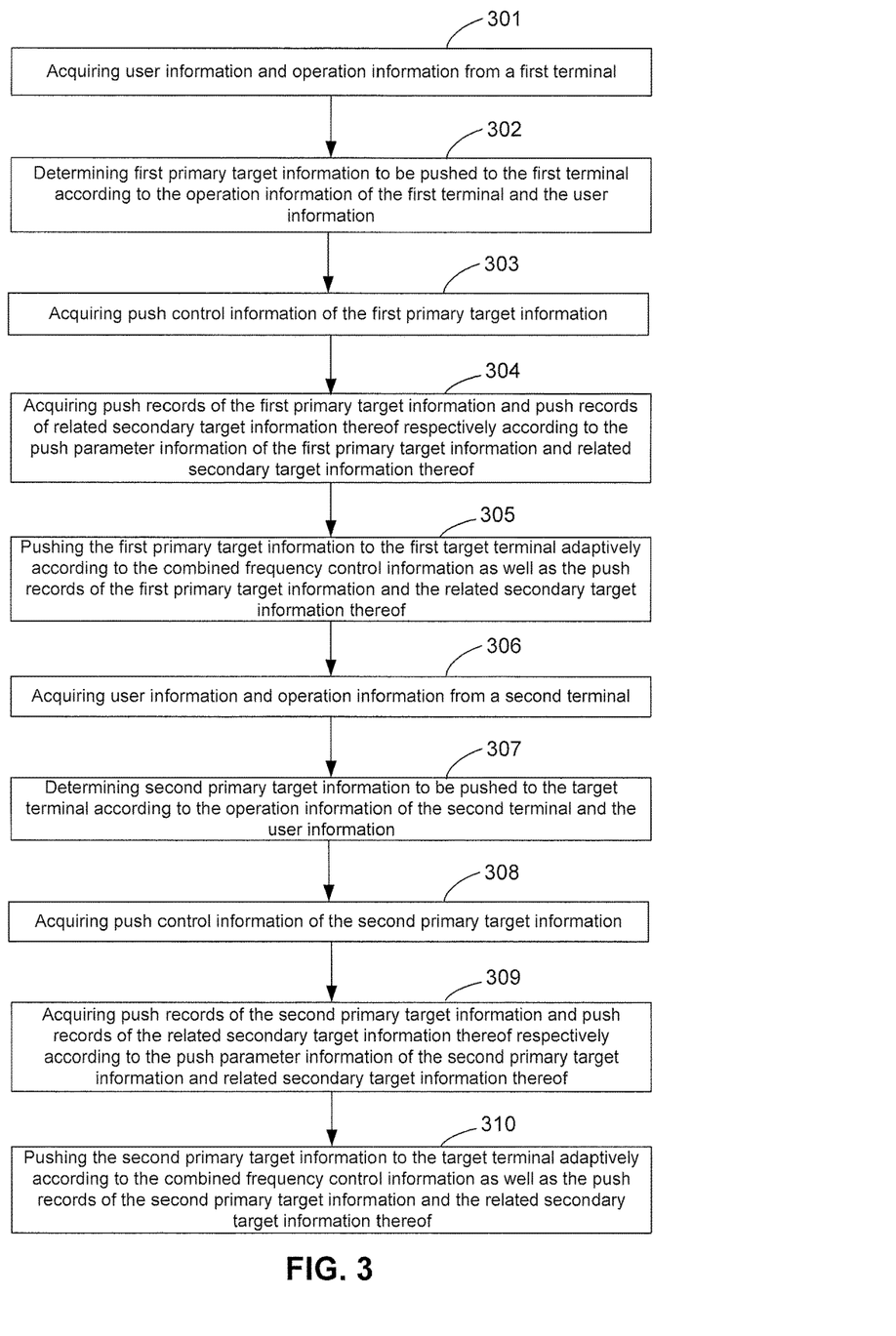
FIG. 3 is a flow chart of an information push method according to another embodiment of the present application.

FIG. 3 is a flow chart of an information push method according to another embodiment of the present application. As shown in the FIG., the information push method according to the embodiment may comprise the steps as follows.

Step 301: Acquiring user information and operation information from a first terminal. Specifically, the first terminal in the embodiment is a PC terminal used by a target user A, wherein the first terminal is communicated with an information push system after logging in with a personal login account number. The user information may comprise the login account number, the user ID, the network address, the cookies and the like of the target terminal. The information push system may monitor operations of the first terminal, for example, such operations as that the user clicks to browse a certain website at the PC terminal, clicks to play a certain video or opens certain software program and the like.

S302: Determining first primary target information to be pushed to the first terminal according to the operation information of the first terminal and the user information. Specifically, the information push system may set push parameter information for each primary target information, wherein the push parameter information comprises conditions for pushing the primary target information to a user in which situations, for example, pushing corresponding primary target information to the user during a "fragmented time" such as before and after playing an internet video, or during a pause status, or starting or ending a software program. The information push system after determining that the primary target information meets a push condition of certain primary target information according to the acquired operation information of the target terminal, determines that the primary target information needs to be pushed to the target terminal. In the embodiment, the information push system may determine that the first primary target information pushed to the first terminal is the medium information a of an information push customer A according to an operation of the user of clicking "pause" during a process of watching a certain video.

Step 303: Acquiring push control information of the first primary target information, wherein the push control information comprises push parameter information of the first primary target information, related secondary target information and combined push frequency control information, wherein the related secondary target information comprises push parameter information of at least one related secondary target information of the first primary target information. In the embodiment, the information push system associates push information a, b and c mutually in advance according to the settings of the information push customer A, wherein a is medium information pushed to a PC terminal user when a playing process of the PC terminal user for watching video of a certain website is paused, b is medium information pushed to the PC terminal user after the PC terminal user clicks to play the video of the website and before the video is played, and c is medium information pushed to a mobile phone terminal user after the mobile phone terminal user clicks to play the video of the website and before the video is played. The combined push frequency control information comprises control cycles set by the information push customer and a push frequency upper limit in each control cycle. For example, the control cycle in the embodiment may be 1 day, and the push frequency upper limit in each control cycle is 2. The push parameter information may comprise such contents as push conditions, information identification and effective time corresponding to the information.

Step 304: Acquiring push records of the first primary target information and push records of related secondary target information thereof respectively according to the push parameter information of the first primary target information and related secondary target information thereof, wherein the push record comprises a push time for pushing the first primary target information or the related secondary target information to a terminal corresponding to the user information in each time. In specific implementation, the information push system may push the primary target information to the terminal according to the push control information of the primary target information when preset push conditions are satisfied, generating the push record of the primary target information during each time of pushing, and writing the push record in a preset push record data base, and the information push system may read the push record from the data base when required. In the embodiment, the push records of the first primary target information and related secondary target information thereof comprise push records of medium information a, b and c to a terminal corresponding to the user information, wherein the terminals corresponding to the user information may comprise the first terminal and an associated terminal logged in with the same login account number as the first terminal. For example, the first terminal is a PC terminal logged in by a user A; other terminals corresponding to the user information may comprise a mobile phone terminal, a tablet computer, an on-vehicle terminal and the like logged in by the user A by using the same login account number.

Step 305: Pushing the first primary target information to the first target terminal adaptively according to the combined push frequency control information as well as the push records of the first primary target information and the related secondary target information thereof. In specific implementation, the information push system may judge whether the push times of the primary target information and the related secondary target information thereof to the terminal corresponding to the user information in the control cycle reaches the push frequency upper limit according to the push records of the primary target information and the related secondary target information thereof; if yes, then stop pushing the primary target information to the target terminal within the current control cycle. For example, the push records of the first primary target information and the related secondary target information thereof acquired in the embodiment comprise push records of medium information a, b and c to the terminal corresponding to the user information, and it is obtained that the medium information b is pushed to the first terminal for once on the current day and no records of pushing the first primary target information and the related secondary target information thereof to other terminals corresponding to the user information; therefore, the push times of the primary target information and the related secondary target information thereof to the terminal corresponding to the user information in the control cycle is only 1, which does not reach the push frequency upper limit in the combined push frequency control information; therefore, the first primary target information is normally pushed to the first terminal.

S306: Acquiring user information and operation information from a second terminal. In specific implementation, the embodiment refers to that a target user A uses a second terminal to log in an information push system again, wherein the second terminal may be a mobile phone, a tablet computer, an on-vehicle terminal or another PC terminal. The information push system may monitor operations of the user A in the second terminal.

Step 307: Determining second primary target information to be pushed to the target terminal according to the operation information of the second terminal and the user information. Specifically, the target user A in the embodiment expects to watch the video which is not watched completely on the first terminal, on the second terminal continuously; therefore, after clicking to play the same video on the second terminal, the information push system determines that the second primary target information to be pushed to the second target terminal is c according to the operation of the second terminal.

Step 308: Acquiring push control information of the second primary target information, wherein the push control information comprises push parameter information of the second primary target information, related secondary target information and combined push frequency control information, wherein the related secondary target information comprises push parameter information of at least one related secondary target information of the second primary target information. Specifically, the information push system in the embodiment finds that information c and information a and b are mutually related secondary target information according to the related secondary target information of the second primary target information.

Step 309: Acquiring push records of the second primary target information and push records of the related secondary target information thereof respectively according to the push parameter information of the second primary target information and related secondary target information thereof, wherein the push record comprises a push time for pushing the primary target information or the related secondary target information to a second terminal corresponding to the user information in each time. In specific implementation, the push records of the second primary target information and the related secondary target information thereof comprise push records of the medium information a, b and c to the terminals corresponding to the login account number of the user A, wherein the terminals corresponding to the user information may comprise the first terminal, the second terminal and other associated terminals logged in with the same login account number.

Step 310: Pushing the second primary target information to the target terminal adaptively according to the combined push frequency control information as well as the push records of the second primary target information and the related secondary target information thereof. To continue the foregoing example, the push records of the second primary target information and the related secondary target information thereof acquired this time comprise push records of the medium information a, b and c to the terminal corresponding to the user information, and it is obtained that the medium information b is pushed to the first terminal for once on the current day, the medium information c is pushed for once and no records of pushing the second primary target information and the related secondary target information thereof to other terminals corresponding to the user information; therefore, the push times of the primary target information and the related secondary target information thereof to the terminal corresponding to the user information of the second terminal in the control cycle are only 2, which reach the push frequency upper limit in the combined push frequency control information; therefore, the second primary target information cannot be pushed to the second terminal. Further, the information push system may modify XML push data of the second primary target information and the related secondary target information thereof according to the combined push frequency control information and the push records of the current second primary target information and the related secondary target information thereof; and then conducts control for pushing the primary target information to the terminal corresponding to the user information of the second terminal according to the modified XML push data, thus implementing control for pushing the second primary target information and the related secondary target information to the user. In an optional embodiment, the information push system may also, after the push times of the primary target information and related secondary target information thereof to the terminal corresponding to the user information reach the push frequency upper limit, change the push strategy for the primary target information and related secondary target information thereof to the terminal corresponding to the user information. For example, pushing the information to the terminal corresponding to the user information is changed from pushing whenever the push conditions are satisfied into pushing for once only in every 10 minutes, or into pushing medium information of a shorter playing time version, and the like.

Figure 4:
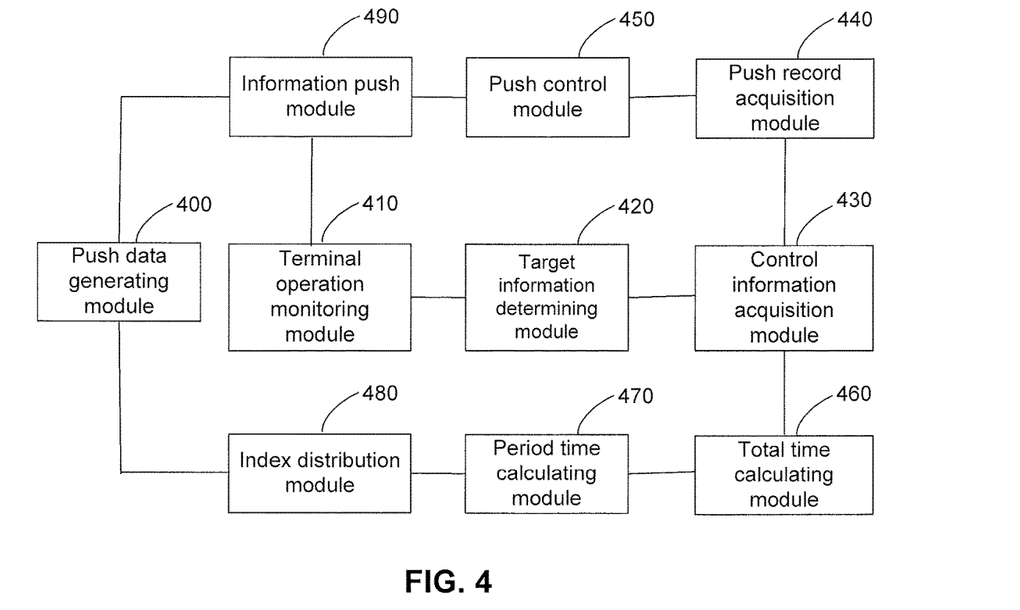
FIG. 4 is a structural block diagram of an information push system according to an embodiment of the present application.

FIG. 4 is a structural block diagram of an information push system according to an embodiment of the present application. The information push system in the embodiment of the present application may be integrally implemented in a background server that provides an information push business. In an optional embodiment, the information push system may also comprise a plurality of servers having specific functions, and the information push in the present application is implemented through the mutual cooperation of the plurality of servers having specific functions. As shown in the FIG., the information push system according to the embodiment may at least comprise the followings.

A terminal operation monitoring module 410, configured to acquire user information and operation information of a target terminal. In specific implementation, the target terminal may log in the information push system with a user account number. After successful login, the monitoring module 410 may acquire the user information of the target terminal, wherein the user information is information used for identifying a user identification, and may comprise the login account number, the user ID, the network address, the cookies and the like of the target terminal, so that the terminal operation monitoring module 410 may monitor operations of the user, for example, such operations of the user as clicking to browse a certain website, clicking to play a certain video or starting a certain software program, and the like.

A primary target information determining module 420, configured to determine the primary target information pushed to the target terminal according to the operation information of the target terminal. In specific implementation, the information push system may set push parameter information for each primary target information, wherein the push parameter information comprises conditions for pushing the primary target information to a user in which situations, for example, pushing corresponding primary target information to the user during a "fragmented time" such as before and after playing an internet video, or during a pause status, or starting or ending a software program. The primary target information determining module 420 after determining that the primary target information meets a push condition of certain primary target information according to the acquired operation information of the target terminal, determines that the primary target information needs to be pushed to the target terminal.

A control information acquisition module 430, configured to acquire push control information of the primary target information. The push control information comprises push parameter information of the primary target information, related secondary target information and combined push frequency control information, wherein the related secondary target information comprises push parameter information of at least one related secondary target information of the primary target information. In specific implementation, the information push system may acquire the push parameter information of the primary target information selected by an information push customer through providing a predetermined reservation interface for the customer in advance, wherein the push parameter information comprises selected useable push conditions and effective time (including start effective time and end effective time), then set at least one other push information as related secondary target information associated with the primary target information according to a selecting operation of the customer, and thereby acquiring combined push frequency control information set by the information push customer, wherein the combined push frequency control information may comprise a control cycle set by the information push customer and a push frequency upper limit in each control cycle. The information push system may write the push control information of the primary target information in a preset push control information data base, and may cancel an association relationship between the push control information and certain or a plurality of related secondary target information in real time according to the operation of the information push customer. The control information acquisition module 430 may read the push control information from the push control information data base when necessary.

A push record acquisition module 440, configured to acquire push records of the primary target information and push records of the related secondary target information respectively according to the push parameter information of the primary target information and the push parameter information of the related secondary target information, wherein the push record comprises a push time for pushing the primary target information or the related secondary target information to a terminal corresponding to the user information in each time. In specific implementation, the information push system may regularly read the push control information of the primary target information from the push control information data base, generate XML push data and transfer the data to a module implementing an information push function to generate primary target information used for pushing, push the primary target information to a target terminal when preset push conditions are satisfied, generate push records of the primary target information during each time of pushing and write the push record in a preset push record data base, and the push record acquisition module 440 may read the push record from the data base when required. In an optional embodiment, the module implementing the information push function in the information push system may be implemented by a single information push server. The information push server regularly reports the push record of the information to a data server of the information push system.

A push control module 450, configured to control for pushing the primary target information to the target terminal according to the combined push frequency control information as well as the push records of the primary target information and the related secondary target information thereof. In specific implementation, the push control module 450 may judge whether the push times of the primary target information and the related secondary target information thereof to the terminal corresponding to the user information in the control cycle reaches the push frequency upper limit according to the push records of the primary target information and the related secondary target information thereof; if yes, then stop pushing the primary target information to the target terminal within the current control cycle. Further, the push control module 450 may modify the XML push data of the primary target information and related secondary target information thereof according to the combined push frequency control information and the push records of the primary target information and related secondary target information thereof; and then a module implementing an information push function controls to push the primary target information to the terminal according to the modified XML push data, thus implementing control for pushing the primary target information to the target terminal. In an optional embodiment, the push control module 450 may also, after the push times of the primary target information and related secondary target information thereof to the terminal corresponding to the user information reach the push frequency upper limit, change the push strategy for the primary target information and related secondary target information thereof to the terminal corresponding to the user information. For example, pushing the information to the terminal corresponding to the user information is changed from pushing whenever the push conditions are satisfied into pushing for once only in every 10 minutes, or into pushing medium information of a shorter push time version, and the like.

Figure 5:
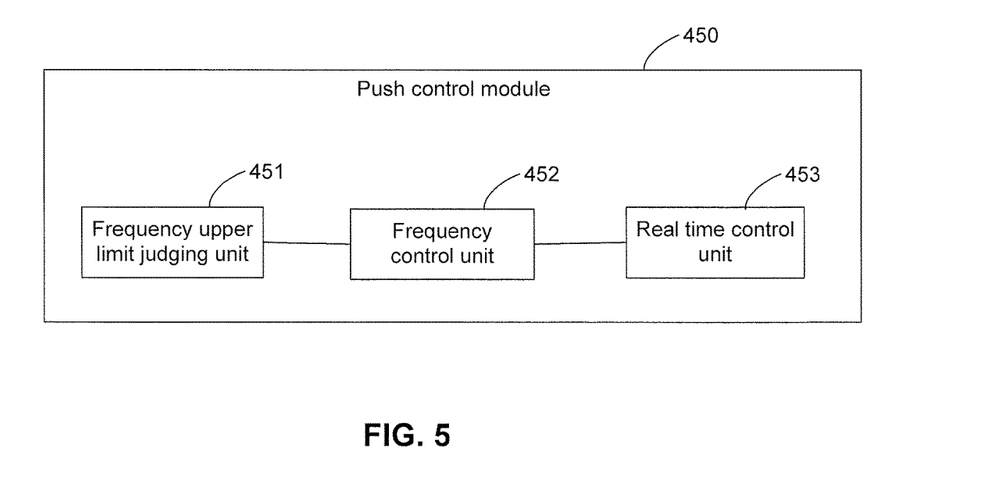
FIG. 5 is a structural block diagram of a frequency control module of the information push system according to the embodiment of the present application.

Optionally, the frequency control module 450 in the embodiment of the present application may further comprise the followings.

A frequency upper limit judging unit 451, configured to judge whether the push times of the primary target information and the related secondary target information thereof to the terminal corresponding to the user information reaches the push frequency upper limit within the control cycle according to the push records of the primary target information and related secondary target information thereof. In specific implementation, the frequency upper limit judging unit 451 may, according to index values carried in the push records of the primary target information and related secondary target information thereof, judge whether the occurring times of the push records carrying the index values corresponding to the time period of control cycle in the push records of the primary target information and related secondary target information thereof reach the push frequency upper limit. Further, the frequency upper limit judging unit 451 may regularly read a counting result of the push records of the primary target information and the related secondary target information thereof. In the embodiment, the counting result is the number of push records carrying the index values corresponding to the current time period of control cycle, wherein the number of found push records carrying the index values corresponding to the current time period of control cycle, which the primary target information and related secondary target information thereof is pushed to the terminal corresponding to the user information, just represents the times of pushing the primary target information and the related secondary target information thereof to the terminal corresponding to the user information in the time period of control cycle. If the push times of the primary target information and related secondary target information thereof pushed to the terminal corresponding to the user information in the current time period of control cycle exceeds the push frequency upper limit, then the frequency upper limit judging unit 451 may trigger a frequency control unit 452.

A frequency control unit 452, configured to stop pushing the primary target information and related secondary target information thereof to the target terminal in the current control cycle after the push times of the primary target information and related secondary target information thereof to the terminal corresponding to the user information in the control cycle reaches the push frequency upper limit. In specific implementation, the frequency control unit 452 may stop pushing the primary target information and the related secondary target information thereof to the target terminal and other terminals corresponding to the user information in the current control cycle. Optionally, the frequency control unit 452 may also, after the push times of the primary target information and the related secondary target information thereof to the terminal corresponding to the user information reaches the push frequency upper limit, change the push strategy for the primary target information and the related secondary target information thereof to the terminal corresponding to the user information. For example, pushing the information is changed from pushing whenever the push conditions are satisfied into pushing for once only in every 10 minutes, or into pushing medium information of a shorter playing time version, and the like.

And thus optionally, the information push system in the embodiment of the present application may further comprise the followings.

A total time calculating module 460, configured to acquire total time of associated push according to the push parameter information of the primary target information and the related secondary target information thereof. In specific implementation, the total time calculating module 460 may respectively acquire start effective time and end effective time of the primary target information and related secondary target information thereof, and the earliest start effective time to the latest end effective time are taken as the total time of associated push. In an optional embodiment, the information push system may also acquire the latest end effective time, and a time period from the current time to the latest end effective time is taken as the total time of associated push.

A period time calculating module 470, configured to acquire at least one time period of control cycle according to the control cycle and the total time of associated push, and generate index values corresponding to each time period of control cycle. In specific implementation, if the control cycle is no less than the total time of associated push, then the period time calculating module 470 may take the total time of associated push as one time period of control cycle. If the control cycle is less than the total time of associated push, then the period time calculating module 470 may split the total time of associated push to obtain 2 or more than 2 time periods of control cycle, wherein each time period of control cycle is uniquely corresponding to one index value.

An index distribution module 480, configured to write at least one time period of control cycle and the corresponding index value thereof in the push control information of the primary target information and the related secondary target information thereof.

An information push module 490, configured to push the primary target information and the related secondary target information thereof according to the push control information comprising at least one time period of control cycle and the corresponding index value thereof, and generate push records of the primary target information and the related secondary target information thereof during each time of pushing. The push records comprise the push time of pushing the primary target information or the related secondary target information to the terminal corresponding to the user information in each time as well as an index value corresponding to the push time in the time period of control cycle. Specifically, the information push module 490 generates primary target information used for pushing according to the push control information, and pushes the primary target information to the target terminal when preset push conditions are satisfied. In an optional embodiment, the information push module 490 may be implemented by a single information push server, and regularly reports push records of the information to the information push system.

Further optionally, the information push system in the embodiment of the present application may further comprise the followings.

A push data generating module 400, configured to generate XML push data according to the push control information of the primary target information, and then the information push module 490 may push the primary target information according to the XML push data, and generate push records of the primary target information during each time of pushing.

Optionally, the frequency control module 450 in the embodiment of the present application may further comprise the followings.

A real time control unit 453, configured to modify the XML push data of the primary target information and the related secondary target information thereof according to the combined push frequency control information and the push records of the primary target information and the related secondary target information thereof. When the push times of the primary target information and the related secondary target information thereof to the terminal corresponding to certain user information reach the push frequency upper limit, the real time control unit adjusts the push strategy for pushing the primary target information and the related secondary target information thereof to the terminal corresponding to the user information in such manner as adding a push control command aiming at the user information or modifying push configuration resources, and sends the modified XML push data to the information push module 490, so that the information push module 490 controls to push the primary target information and the related secondary target information thereof to the terminal according to the modified XML push data, thus being capable of pushing the primary target information and the related secondary target information thereof to the target terminal according to the frequency control of the frequency control unit 452.

According to the embodiments of the present application, the primary target information and the related secondary target information thereof are controlled by using the same frequency through establishing an association relationship between the push information, thus implementing more accurate and flexible control for the exposure frequency of the related secondary target information, and strictly controlling the repeated push of relevant information, thereby avoiding the situation of damaged user experience.

Figure 6:
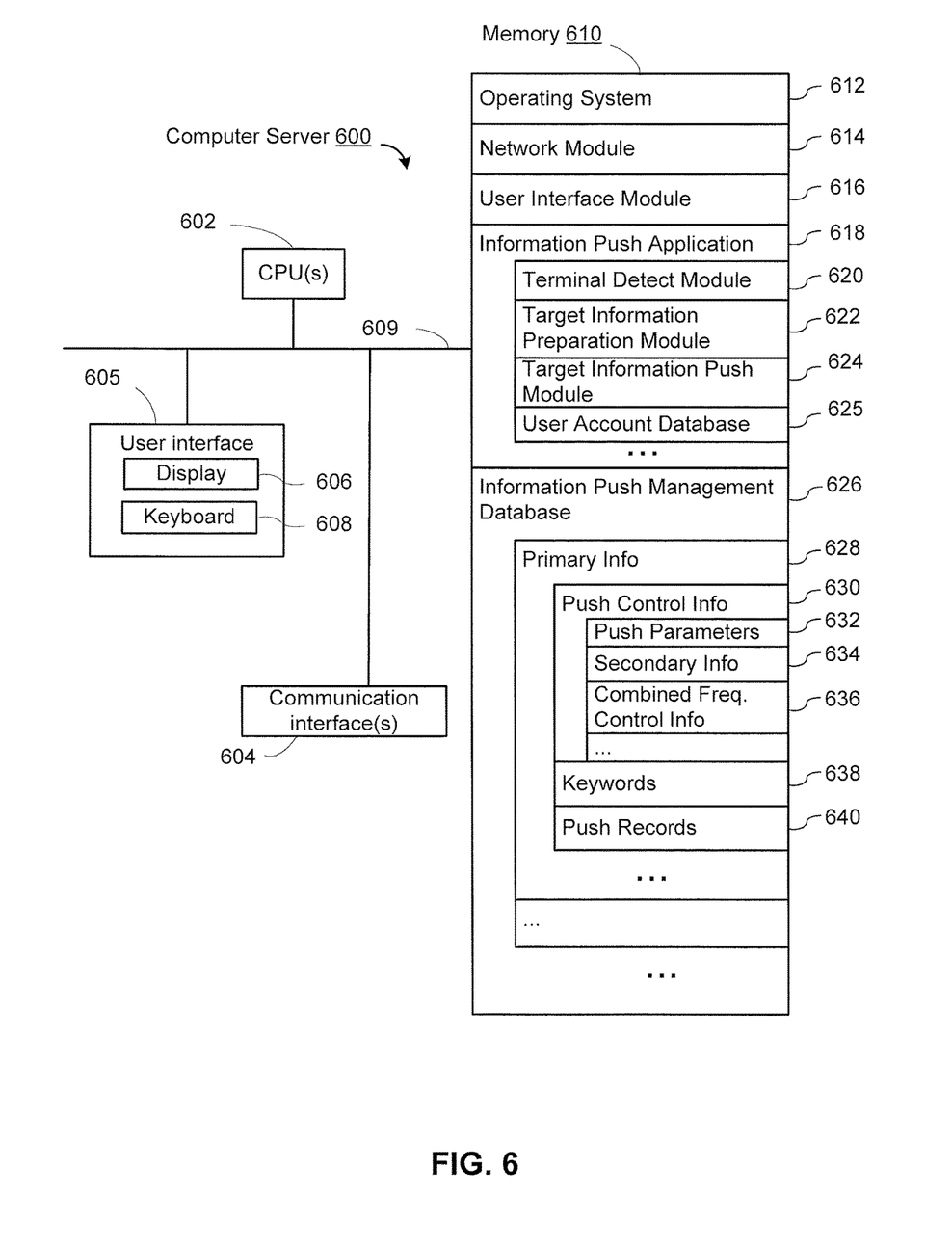
FIG. 6 is a structural diagram of components of a computer server according to an embodiment of the present application.

FIG. 6 is a structural diagram of components of a computer server 600 in accordance with some embodiments of the present application. The exemplary computer server 600 typically includes one or more processing units (CPU's) 602, one or more network or communications interfaces 604, memory 610, and one or more communication buses 609 for interconnecting these components and with other computer systems (e.g., the first and second terminals). The communication buses 609 may include circuitry (sometimes called a chipset) that interconnects and controls communications between system components. The computer server 600 may optionally include a user interface 605, for instance, a display 606, and a keyboard 608. Memory 610 may include high speed random access memory and may also include non-transitory computer readable medium, such as one or more magnetic disk storage devices. Memory 610 may include mass storage that is remotely located from the CPU's 602. In some embodiments, memory 610 stores the following programs, modules and data structures, or a subset or superset thereof:
- an operating system 612 that includes procedures for handling various basic system services and for performing hardware dependent tasks;
- a network module 614 that is used for connecting the computer server 600 to the terminals and other computer systems (e.g., PC, tablet or smartphone) via one or more communication networks (wired or wireless), such as the Internet, other wide area networks, local area networks, metropolitan area networks, and so on;
- a user interface module 616 configured to receive user inputs through the user interface 605;
- an information push application 618, the information push application 618 further including:
  - a terminal detect module 620 as described above for detecting operations initiated by an end user from a target terminal; in some embodiments, the end user logs into a user account associated with the information push application 618 such that the user-initiated operation can be uniquely associated with a particular user account;
  - a target information preparation module 622 as described above for determining primary target information to be pushed to the target terminal;
  - a target information push module 624 as described above for pushing the primary target information to the target terminal according to a predefined schedule when certain conditions are met; and
  - a user account database 625 for managing a plurality of user accounts associated with the information push application, the database 625 further including information defining a profile for each individual user that characterizes the user's interest in the target information;
  - an information push management database 626 as described above for managing the selection and push timing of target information to different terminals; in some embodiments, the data is organized by different pieces of primary target information 628. For example, a primary target information entry 628 further includes push control information 630 such as push parameters 632 for the primary target information and the related secondary target information 634 and the combined frequency control information 636. In some embodiments, the primary target information entry 628 further includes one or more keywords 638 and the push records 640 of the primary and second target information when they were pushed to different end users in the past.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain principles of the present application and its practical applications, to thereby enable others skilled in the art to best utilize the present application and various embodiments with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method for adaptively pushing primary target information to terminals associated with a user, comprising:
    at a server having one or more processors and memory storing programs executed by the one or more processors:
        detecting an operation initiated by the user from a target terminal of a first type;
        determining, among multiple pieces of secondary target information corresponding to one product, each of the multiple pieces of secondary target information being configured for display on a respective type of terminal, a piece of primary target information to be pushed to the user on the target terminal in accordance with operation information of the target terminal and information of the user;
        acquiring push control information for the piece of primary target information, wherein the push control information includes (i) push parameter information including device types for displaying the respective pieces of secondary target information, and (ii) combined push frequency control information, and wherein the combined push frequency control information includes (1) a control cycle corresponding to a predetermined time period for pushing the multiple pieces of secondary target information corresponding to one product to the user on the terminals of respective types associated with the user, and (2) a predetermined upper limit times for pushing the multiple pieces of secondary target information to respective types of terminals associated with the user within the control cycle;
        acquiring push records of the multiple pieces of secondary target information that have been pushed to multiple types of terminals associated with the user within the control cycle, the multiple types of terminals including personal computer, tablet computer, mobile phone, smartphone, and laptop computer, wherein the push records include a frequency of pushing the multiple pieces of secondary target information to one or more terminals of the first type associated with the user within the control cycle; and
        pushing the piece of primary target information to the target terminal adaptively according to the combined push frequency control information as well as the push records of the multiple pieces of secondary target information thereof, wherein pushing the primary target information comprises:
            in accordance with a determination that (1) a combination of push times from the push records of the multiple pieces of secondary target information that have been pushed to the multiple types of terminals associated with the user is below the upper limit of push frequency times for pushing the multiple pieces of secondary target information to respective terminals associated with the user within the control cycle, and (2) the frequency of pushing the multiple pieces of secondary target information to the one or more terminals of the first type associated with the user within the control cycle satisfies a predetermined criterion:
                pushing the primary target information to the user on the target terminal.

2. The method of claim 1, further comprising:
    in accordance with a determination that the combination of push times from the push records of the multiple pieces of secondary target information that have been pushed to the multiple types of terminals associated with the user equals to or exceeds the upper limit of push frequency times for pushing the multiple pieces of secondary target information to respective terminals associated with the user within the control cycle:
    stopping pushing the piece of primary target information to the user on the target terminal.

3. The method of claim 1, wherein the information of the user includes a user identifier of the user and one or more device identifiers of terminals from which the user initiates operations and the operation information includes a source of information provided to the target terminal and a current location of the target terminal.

4. The method of claim 1, further comprising:
    generating XML push data using the push control information of the piece of primary target information; and
    pushing the piece of primary target information to the target terminal in accordance with the XML push data and generating a push record for the piece of primary target information.

5. The method of claim 1, wherein the step of pushing the primary target information to the target terminal adaptively further includes:
    determining a pattern from the push records of multiple pieces of secondary target information thereof;

determining a timing of pushing the piece of primary target information to the target terminal by comparing a current time and location of the target terminal with the determined pattern; and pushing the piece of primary target information to the target terminal at the determined timing.

6. A computer server, comprising:

one or more processors;

memory; and one or more programs modules stored in the memory and configured for execution by the one or more processors, the one or more program modules including instructions for:

detecting an operation initiated by the user from a target terminal of a first type;

determining, among multiple pieces of secondary target information corresponding to one product, each of the multiple pieces of secondary target information being configured for display on a respective type of terminal, a piece of primary target information to be pushed to the user on the target terminal in accordance with operation information of the target terminal and information of the user;

acquiring push control information for the piece of primary target information, wherein the push control information includes (i) push parameter information including device types for displaying the respective pieces of secondary target information, and (ii) combined push frequency control information, and wherein the combined push frequency control information includes (1) a control cycle corresponding to a predetermined time period for pushing the multiple pieces of secondary target information corresponding to one product to the user on the terminals of respective types associated with the user, and (2) a predetermined upper limit times for pushing the multiple pieces of secondary target information to respective types of terminals associated with the user within the control cycle;

acquiring push records of the multiple pieces of secondary target information that have been pushed to multiple types of terminals associated with the user within the control cycle, the multiple types of terminals including personal computer, tablet computer, mobile phone, smartphone, and laptop computer, wherein the push records include a frequency of pushing the multiple pieces of secondary target information to one or more terminals of the first type associated with the user within the control cycle; and     pushing the piece of primary target information to the target terminal adaptively according to the combined push frequency control information as well as the push records of the multiple pieces of secondary target information thereof, wherein pushing the primary target information comprises:

in accordance with a determination that (1) a combination of push times from the push records of the multiple pieces of secondary target information that have been pushed to the multiple types of terminals associated with the user is below the upper limit of push frequency times for pushing the multiple pieces of secondary target information to respective terminals associated with the user within the control cycle, and (2) the frequency of pushing the multiple pieces of secondary target information to the one or more terminals of the first type associated with the user within the control cycle satisfies a predetermined criterion:

pushing the primary target information to the user on the target terminal.

7. The computer server of claim 6, wherein the one or more program modules further include instructions for:

in accordance with a determination that the combination of push times from the push records of the multiple pieces of secondary target information that have been pushed to the multiple types of terminals associated with the user equals to or exceeds the upper limit of push frequency times for pushing the multiple pieces of secondary target information to respective terminals associated with the user within the control cycle:

stopping pushing the piece of primary target information to the user on the target terminal.

8. The computer server of claim 6, wherein the information of the user includes a user identifier of the user and one or more device identifiers of terminals from which the user initiates operations and the operation information includes a source of information provided to the target terminal and a current location of the target terminal.

9. The computer server of claim 6, wherein the one or more program modules further include instructions for:

generating XML push data using the push control information of the piece of primary target information; and     pushing the piece of primary target information to the target terminal in accordance with the XML push data and generating a push record for the piece of primary target information.

10. The computer server of claim 6, wherein the instruction of pushing the primary target information to the target terminal adaptively further includes instructions for:

determining a pattern from the push records of the multiple pieces of secondary target information thereof;

determining a timing of pushing the piece of primary target information to the target terminal by comparing a current time and location of the target terminal with the determined pattern; and     pushing the piece of primary target information to the target terminal at the determined timing.

11. A non-transitory computer-readable medium, having instructions stored thereon, which, when executed by a computer server having one or more processors and memory, cause the computer server to perform one or more operations comprising:

detecting an operation initiated by the user from a target terminal of a first type;

determining, among multiple pieces of secondary target information corresponding to one product, each of the multiple pieces of secondary target information being configured for display on a respective type of terminal, a piece of primary target information to be pushed to the user on the target terminal in accordance with operation information of the target terminal and information of the user;

acquiring push control information for the piece of primary target information, wherein the push control information includes (i) push parameter information including device types for displaying the respective pieces of secondary target information, and (ii) combined push frequency control information, and wherein the combined push frequency control information includes (1) a control cycle corresponding to a predetermined time period for pushing the multiple pieces of secondary target information corresponding to one product to the user on the terminals of respective types associated with the user, and (2) a predetermined upper limit times for pushing the multiple pieces of secondary target information to respective types of terminals associated with the user within the control cycle;

acquiring push records of the multiple pieces of secondary target information that have been pushed to multiple types of terminals associated with the user within the control cycle, the multiple types of terminals including personal computer, tablet computer, mobile phone, smartphone, and laptop computer, wherein the push records include a frequency of pushing the multiple pieces of secondary target information to one or more terminals of the first type associated with the user within the control cycle; and pushing the piece of primary target information to the target terminal adaptively according to the combined push frequency control information as well as the push records of the multiple pieces of secondary target information thereof, wherein pushing the primary target information comprises:

in accordance with a determination that (1) a combination of push times from the push records of the multiple pieces of secondary target information that have been pushed to the multiple types of terminals associated with the user is below the upper limit of push frequency times for pushing the multiple pieces of secondary target information to respective terminals associated with the user within the control cycle, and (2) the frequency of pushing the multiple pieces of secondary target information to the one or more terminals of the first type associated with the user within the control cycle satisfies a predetermined criterion:

pushing the primary target information to the user on the target terminal.

12. The non-transitory computer-readable medium of claim 11, further comprising instructions for:

in accordance with a determination that the combination of push times from the push records of the multiple pieces of secondary target information that have been pushed to the multiple types of terminals associated with the user equals to or exceeds the upper limit of push frequency times for pushing the multiple pieces of secondary target information to respective terminals associated with the user within the control cycle:

stopping pushing the piece of primary target information to the user on the target terminal.

13. The non-transitory computer-readable medium of claim 11, wherein the information of the user includes a user identifier of the user and one or more device identifiers of terminals from which the user initiates operations and the operation information includes a source of information provided to the target terminal and a current location of the target terminal.

14. The non-transitory computer-readable medium of claim 11, wherein the one or more operations further comprise:

generating XML push data using the push control information of the piece of primary target information; and pushing the piece of primary target information to the target terminal in accordance with the XML push data and generating a push record for the piece of primary target information.

* * * * *